United States Patent
Neag et al.

(10) Patent No.: US 10,807,540 B1
(45) Date of Patent: Oct. 20, 2020

(54) VEHICLE HAVING ROOF BOW

(71) Applicants: Dorinel Neag, Commerce Township, MI (US); Carl Mather, Lake Orion, MI (US)

(72) Inventors: Dorinel Neag, Commerce Township, MI (US); Carl Mather, Lake Orion, MI (US)

(73) Assignee: FCA US LLC, Auburn Hills, MI (US)

(*) Notice: Subject to any disclaimer, the term of this patent is extended or adjusted under 35 U.S.C. 154(b) by 0 days.

(21) Appl. No.: 16/574,690

(22) Filed: Sep. 18, 2019

(51) Int. Cl.
| B60R 9/045 | (2006.01) |
| B60R 9/048 | (2006.01) |
| B60R 9/052 | (2006.01) |
| B60R 9/058 | (2006.01) |

(52) U.S. Cl.
CPC .............. B60R 9/048 (2013.01); B60R 9/058 (2013.01); *B60R 9/052* (2013.01)

(58) Field of Classification Search
CPC ......... B60R 9/045; B60R 9/048; B60R 9/052; B60R 9/058
See application file for complete search history.

(56) References Cited

U.S. PATENT DOCUMENTS

| 2,387,779 | A | * | 10/1945 | Strauss | B60R 9/045 224/314 |
| 3,899,110 | A | * | 8/1975 | Binding | B60R 9/045 224/314 |
| 3,902,641 | A | * | 9/1975 | Peasley | B60R 9/058 224/318 |
| 4,449,656 | A | * | 5/1984 | Wouden | B60R 9/045 224/320 |
| 4,752,022 | A | * | 6/1988 | Thulin | B60R 9/045 224/314 |
| 6,959,844 | B2 | * | 11/2005 | Potter | B60R 9/045 224/321 |
| 8,096,454 | B2 | | 1/2012 | Aftanas et al. | |
| 8,167,179 | B2 | * | 5/2012 | Thomas | B60R 9/045 224/315 |
| 8,235,264 | B2 | | 8/2012 | Aftanas et al. | |
| 8,348,111 | B2 | | 1/2013 | Heuchert et al. | |
| 8,528,799 | B2 | | 9/2013 | Michie et al. | |
| 9,150,160 | B2 | * | 10/2015 | Aftanas | B60R 9/058 |

* cited by examiner

*Primary Examiner* — Justin M Larson
(74) *Attorney, Agent, or Firm* — Ralph E Smith

(57) ABSTRACT

A vehicle includes a vehicle body having a roof and a roof bow. The roof bow is removably coupled to the roof of the vehicle body and includes a cross member and end brackets pivotably attached to opposing ends of the cross member. The end brackets are pivotable between a deployed position in which the end brackets extend outwardly from the cross member and a stowed position in which the end brackets are positioned substantially between opposing ends of the cross member. A length of the roof bow is greater when the end brackets are in the deployed position then when the end brackets are in the stowed position.

13 Claims, 7 Drawing Sheets

VEHICLE HAVING ROOF BOW

FIELD

The present disclosure relates to a vehicle having a roof bow.

BACKGROUND

This section provides background information related to the present disclosure and is not necessarily prior art.

Some vehicles include roof bows that are coupled to the vehicle and can support various articles thereon such as bikes, sporting equipment, etc. Such roof bows are stowed in a side rail that is attached to a roof of the vehicle when not in use. The teachings of the present disclosure provides a roof bow that is removably coupled to the roof of a vehicle and can be conveniently stored in a storage bin or area that is within the vehicle (e.g., within a trunk of the vehicle) when removed from the roof of the vehicle.

SUMMARY

This section provides a general summary of the disclosure, and is not a comprehensive disclosure of its full scope or all of its features.

In one form, the present disclosure provides a vehicle that includes a vehicle body having a roof and a roof bow. The roof bow is removably coupled to the roof of the vehicle body and includes a cross member and end brackets pivotably attached to opposing ends of the cross member. The end brackets are pivotable between a deployed position in which the end brackets extend outwardly from the cross member and a stowed position in which the end brackets are positioned substantially between the cross member. A length of the roof bow is greater when the end brackets are in the deployed position then when the end brackets are in the stowed position.

In some configurations of the vehicle of the above paragraph, the cross member includes an elongated body and end caps fixed to opposing ends of the elongated body. The end brackets are pivotally coupled to the end caps.

In some configurations of the vehicle of any one or more of the above paragraphs, the elongated body and the end brackets are made of a metallic material and the end caps are made of a polymeric material.

In some configurations of the vehicle of any one or more of the above paragraphs, each end cap includes a recess formed therein. Each end bracket is received in the recess when in the stowed position.

In some configurations of the vehicle of any one or more of the above paragraphs, the recess has a pivot section and a decorative section. The end bracket has a pivot portion and decorative portion.

In some configurations of the vehicle of any one or more of the above paragraphs, the pivot portion is received in the pivot section when the end bracket is in the stowed position and the deployed position. The decorative portion is received in the decorative section when the end bracket is in the stowed position and removed from the decorative section when the end bracket is in the deployed position.

In some configurations of the vehicle of any one or more of the above paragraphs, the decorative section of the recess is positioned inwardly relative to the pivot section of the recess.

In some configurations of the vehicle of any one or more of the above paragraphs, a fastener extends through a respective end bracket and a respective end cap when the end bracket is in the deployed position to retain the end bracket in the deployed position.

In some configurations of the vehicle of any one or more of the above paragraphs, each end bracket is pivotable about a respective pivot axis that extends at an angle relative to a vertical axis.

In some configurations of the vehicle of any one or more of the above paragraphs, the angle between the respective axis and the vertical axis is between 20 degrees and 75 degrees.

In some configurations of the vehicle of any one or more of the above paragraphs, side rails are coupled to opposing sides of the roof and extending parallel to each other. The roof bow extends between the side rails and each end bracket is removably coupled to a respective side rail.

In some configurations of the vehicle of any one or more of the above paragraphs, another roof bow is removably coupled to the roof the vehicle body.

In some configurations of the vehicle of any one or more of the above paragraphs, each end bracket is rotated between 150 degrees and 195 degrees about a respective pivot axis from the deployed position to the stowed position.

In some configurations of the vehicle of any one or more of the above paragraphs, a decorative member is coupled to each end bracket, and wherein the decorative member is made of a polymeric material.

Further areas of applicability will become apparent from the description provided herein. The description and specific examples in this summary are intended for purposes of illustration only and are not intended to limit the scope of the present disclosure.

DRAWINGS

The drawings described herein are for illustrative purposes only of selected embodiments and not all possible implementations, and are not intended to limit the scope of the present disclosure.

Corresponding reference numerals indicate corresponding parts throughout the several views of the drawings.

DETAILED DESCRIPTION

Example embodiments will now be described more fully with reference to the accompanying drawings.

Figure 1:
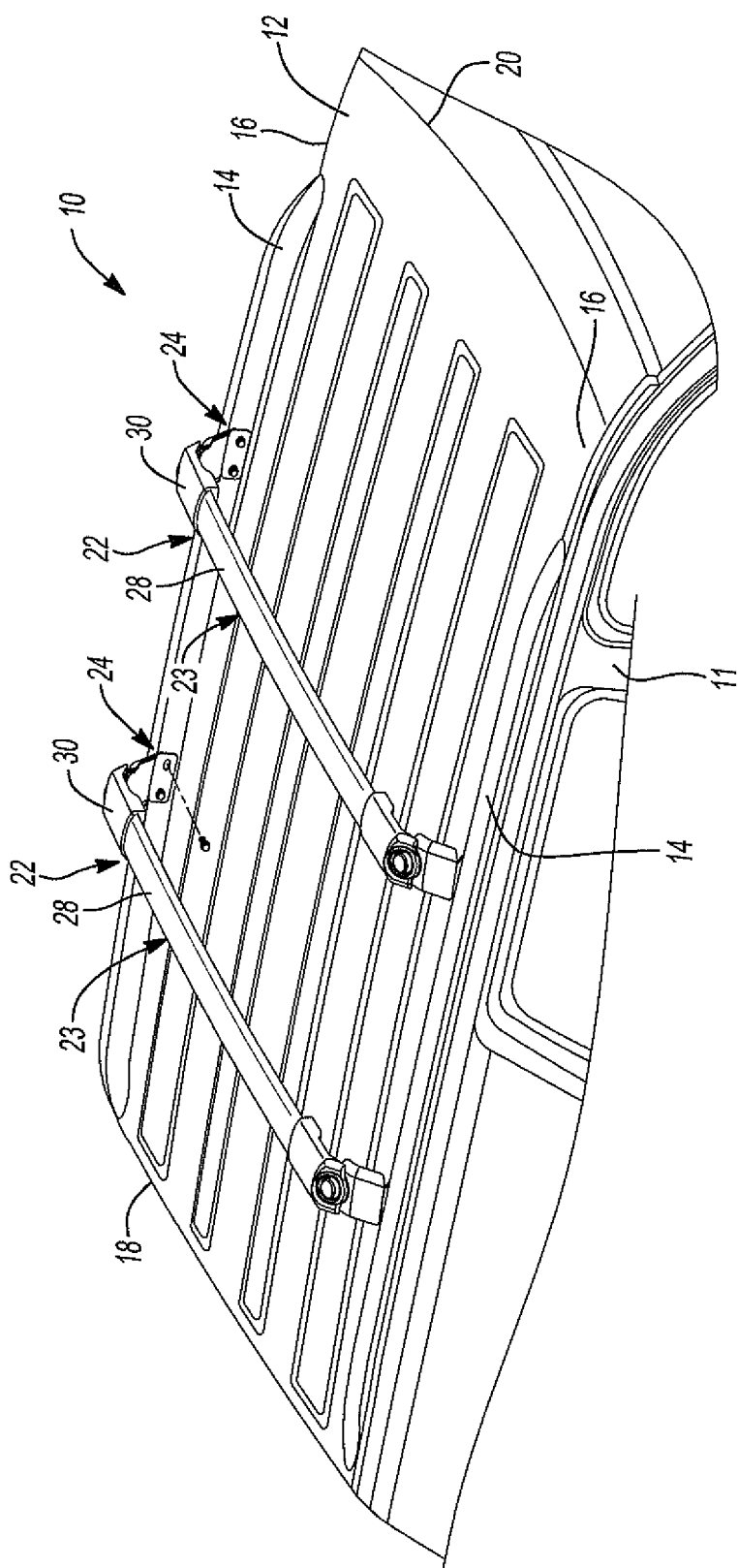
FIG. 1 is a partial perspective view of a vehicle including a plurality of roof bows according to the principles of the present disclosure.
Figure 2:
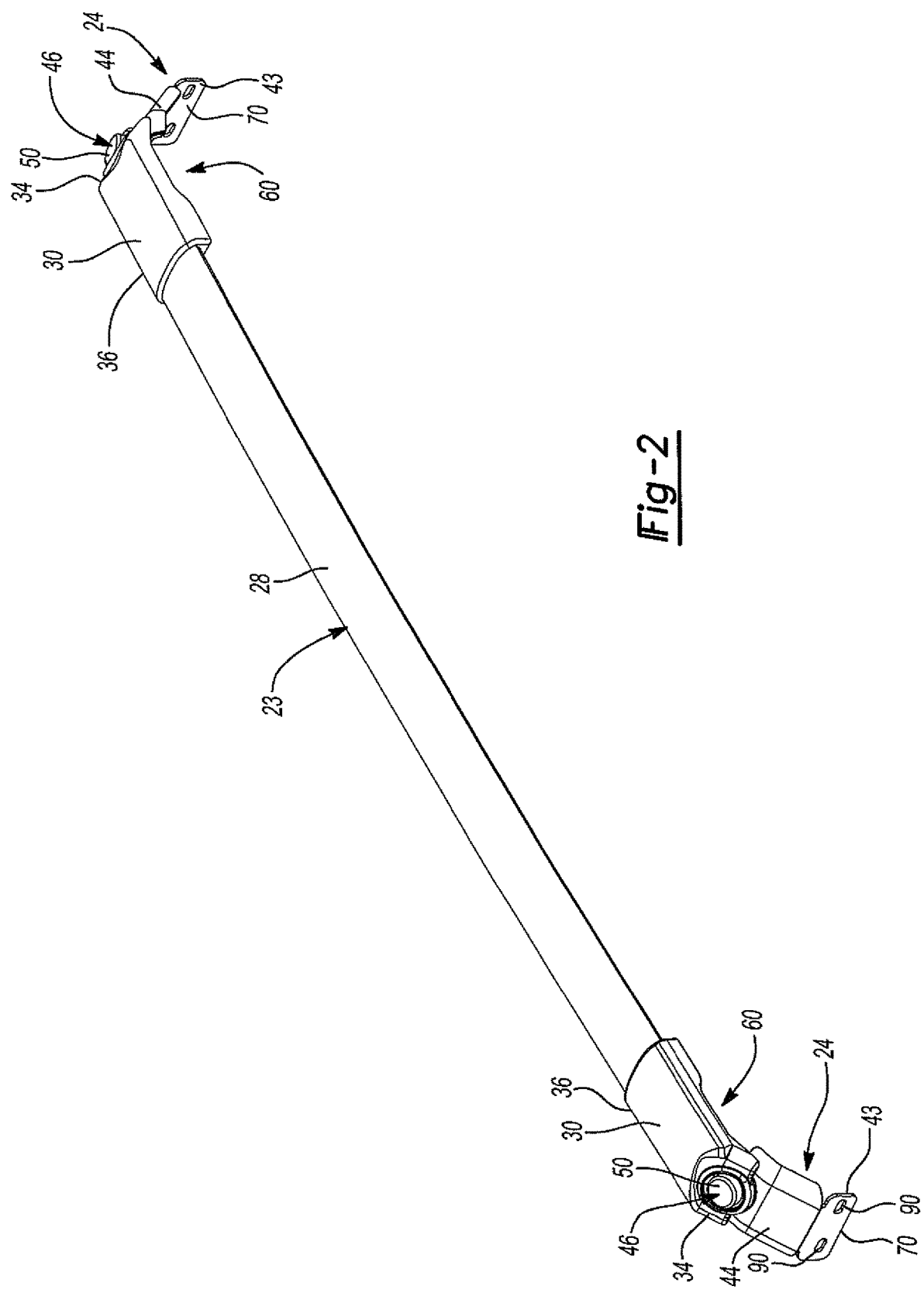
FIG. 2 is a perspective view of one of the roof bows of FIG. 1 with end cap assemblies in a deployed position.

As shown in FIG. 1, a vehicle 10 is provided. The vehicle 10 includes a body 11 having a roof 12. In some configurations, the vehicle 10 is a sport utility vehicle or the vehicle 10 could be a minivan or any other type of vehicle. A pair of elongated side rails 14 are fixed to opposing sides 16 of the roof 12 and extend from a rear end 18 of the roof 12 toward a front end 20 of the roof 12 (i.e., the side rails 14 extend parallel to each other and to a longitudinal axis of the vehicle 10). One or more roof bows 22 are removably coupled to the side rails 14 and are spaced apart from each other. For example, one of the roof bows 22 is positioned near or at a rear end of the side rails 14 while another roof bow 22 is positioned near or at a front end of the side rails 14. The roof bows 22 also extend perpendicular to the side rails 14 and the longitudinal axis of the vehicle 10. When coupled to the side rails 14, the roof bows 22 can support various articles thereon such as bikes, sporting equipment, luggage and/or other cargo. When disconnected from the side rails 14, the roof bows 22 can be stored in a storage bin (not shown) that is positioned within the vehicle 10 (e.g., within the trunk or storage area of the vehicle 10) or alternatively, the roof bows 22 could be stored separately from the vehicle 10, such as in the user's garage or home.

As shown in FIGS. 1-9, each roof bow 22 includes a cross member 23 and end cap assemblies 24 that are coupled to opposing ends of the cross member 23. The cross member 23 includes an elongated body 28 and end caps 30. The elongated body 28 can be formed by extrusion, for example, and is made of a metallic material (e.g., aluminum). In some configurations, the elongated body 28 can be made of other lightweight, rigid materials such as a composite material, for example. When the roof bow 22 is coupled to the side rails 14, the body 28 is spaced apart from the roof 12 of the vehicle 10.

Figure 5:
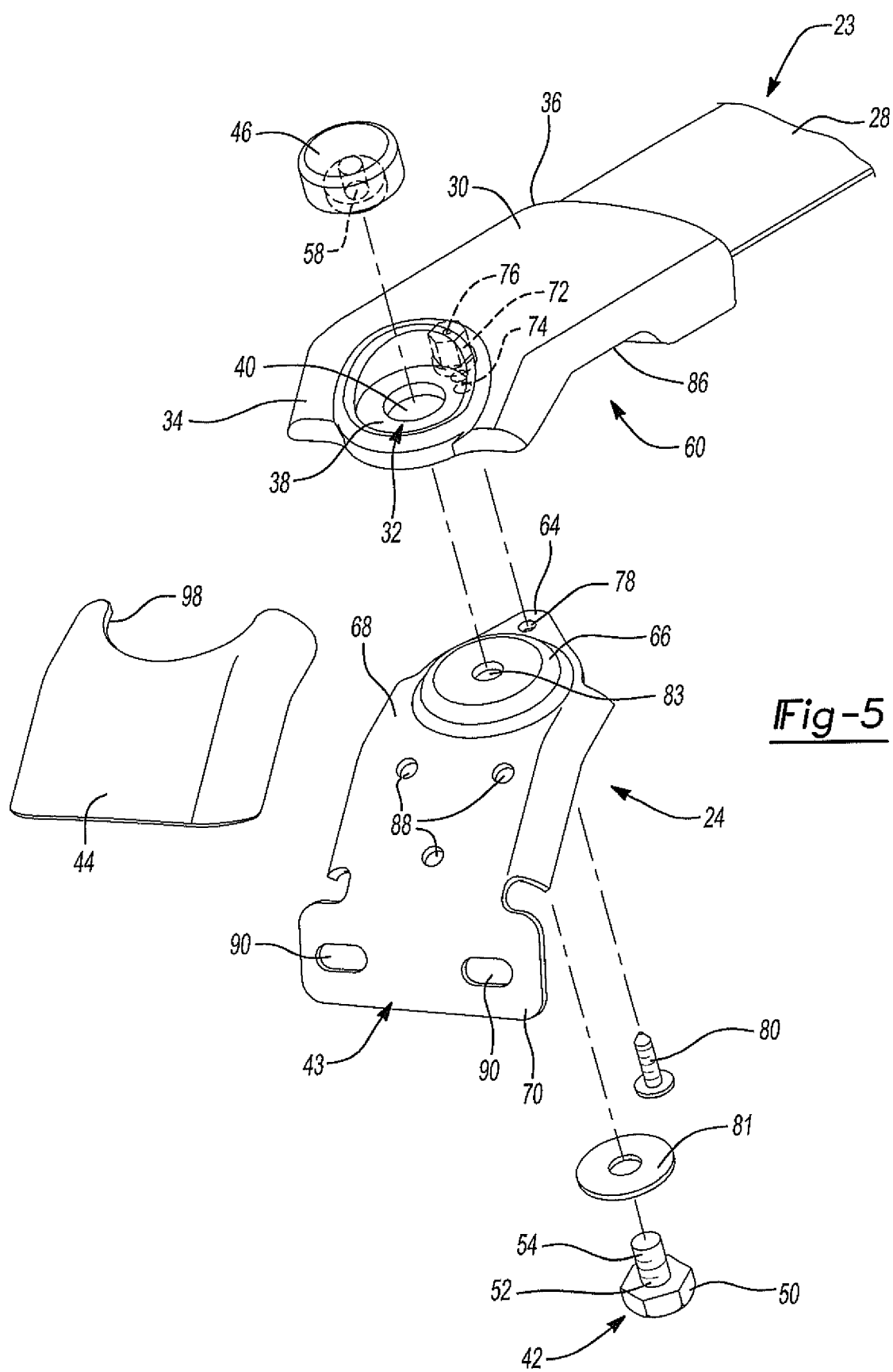
FIG. 5 is another exploded view of one of the end cap assemblies of the roof bow.
Figure 6:
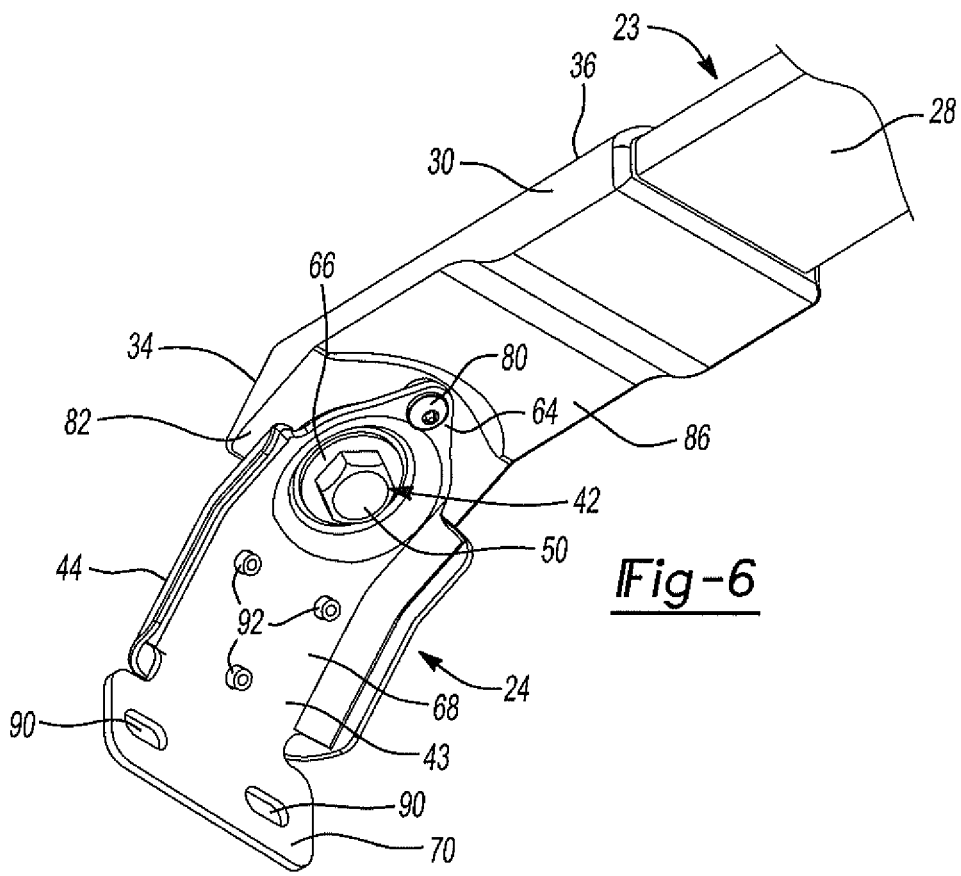
FIG. 6 is a perspective view of one of the end cap assemblies in the deployed position.
Figure 7:
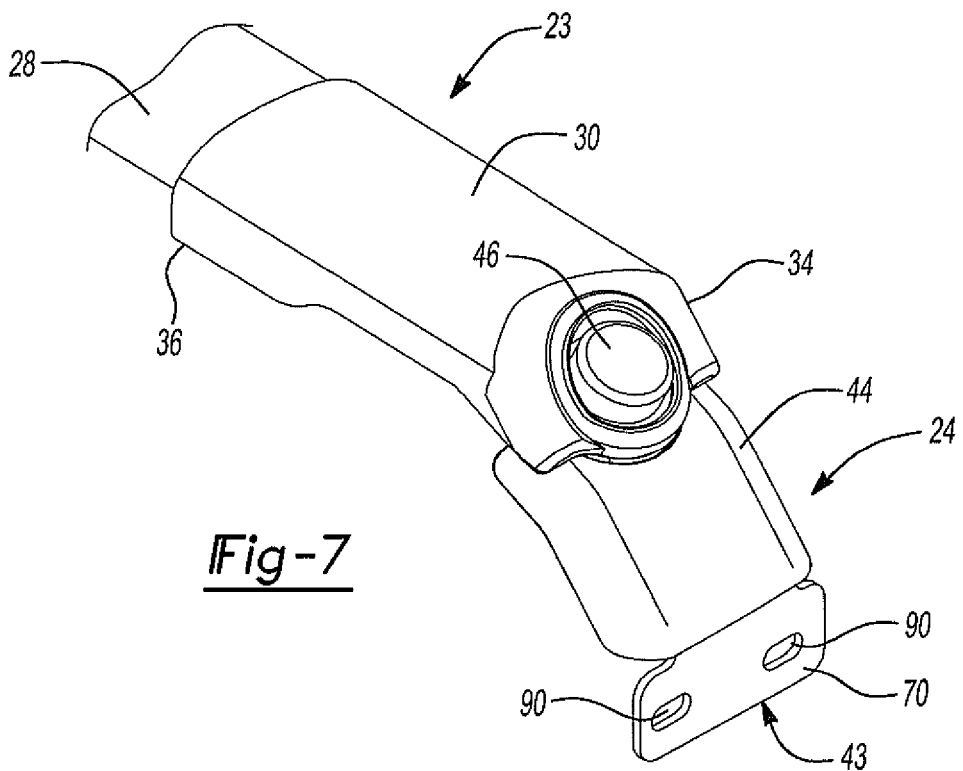
FIG. 7 is another perspective view of one of the end cap assemblies in the deployed position.

Each end cap 30 is coupled to a respective end of the elongated body 28. For example, the end cap 30 can be overmolded onto the respective end of the elongated body 28. The end cap 30 can be made of a polymeric or metallic material, for example, and includes a recess 32 formed at an end 34 thereof (i.e., the end 34 is opposing end 36 of the end cap 30 that is coupled to the respective end of the elongated body 28). The end 34 also has a thickness that is smaller than a thickness of the end 36. The recess 32 defines a bottom surface 38 that has an aperture 40 extending therethrough (FIGS. 5, 8 and 9).

Each end cap assembly 24 includes a pivot pin 42, an end bracket 43 and a decorative member 44. A cap 46 is received in the recess 32 and extends at least partially through the aperture 40. The cap 46 has an annular surface 48 that is seated on (i.e., contacts) the bottom surface 38 of the recess 32.

Figure 8:
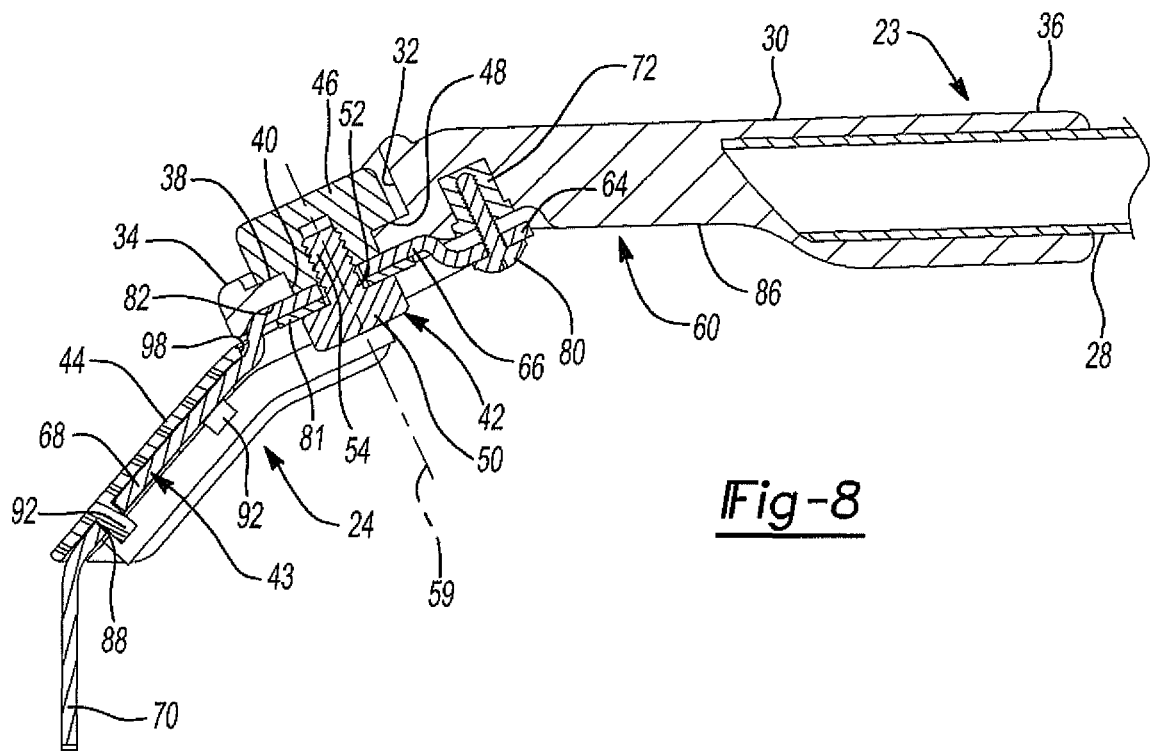
FIG. 8 is a partial cross-sectional view of the roof bow with one of the end cap assemblies in the deployed position.
Figure 9:
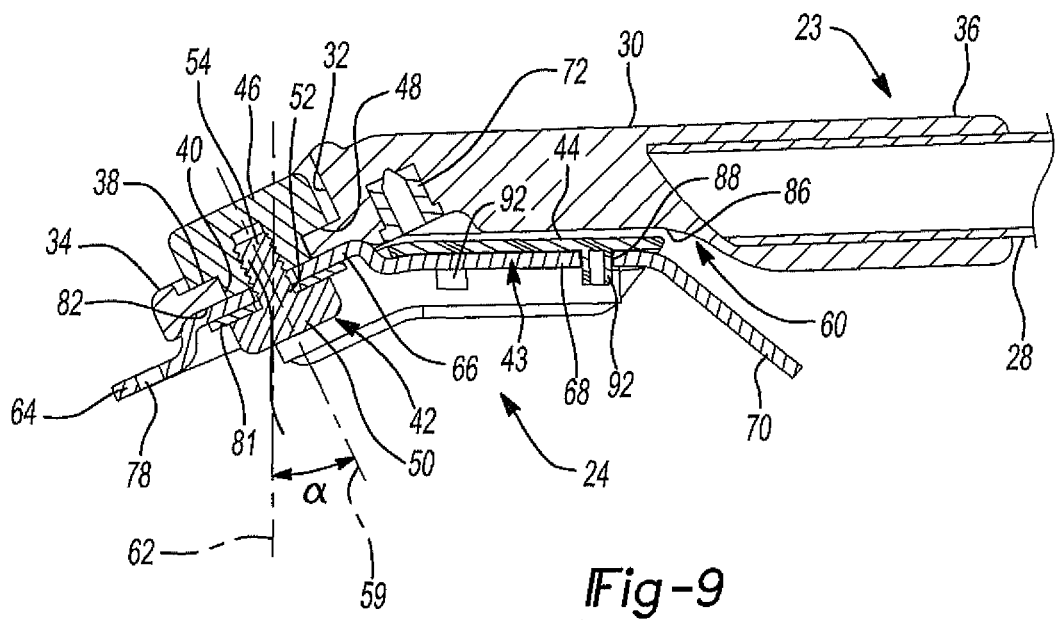
FIG. 9 is another partial cross-sectional view of the roof bow with one of the end cap assemblies in a stowed position.

As shown in FIGS. 8 and 9, the pivot pin 42 extends through the end bracket 43, the aperture 40 of the end cap 30 and at least partially through the cap 46, and pivotably couples the end bracket 43 to the end cap 30. The pivot pin 42 includes a head 50, an intermediate portion 52 and an end portion 54. The intermediate portion 52 has a diameter that is smaller than a diameter of the head 50 and equal to a diameter of the end portion 54. The intermediate portion 52 is unthreaded. The intermediate portion 52 is disposed between the head 50 and the end portion 54, and accommodates the end bracket 43 (i.e., the end bracket 43 pivots around the intermediate portion 52 of the pivot pin 42). The end portion 54 is securely received in an aperture 58 formed in the cap 46, thereby securing the end bracket 43 and the end cap 30 to each other.

The end bracket 43 is coupled to a respective end cap 30 (via the pivot pin 42) and is pivotable about an axis 59 of the pivot pin 42 between a deployed position (FIG. 8) in which the end bracket 43 extends outwardly from the cross member 23 and a stowed position (FIG. 9) in which the end bracket 43 is received in a recess 60 formed by the respective cap 30. In some configurations, the end bracket 43 is rotated between 150 degrees and 195 degrees (e.g., 180 degrees) about the axis 59 between the deployed position and the stowed position. The axis 59 extends at an angle $\alpha$ relative to a vertical axis 62 (i.e., the vertical axis 62 is perpendicular to the longitudinal axis of the vehicle 10). In some configurations, the angle $\alpha$ is between 20 degrees and 75 degrees.

Figure 3:
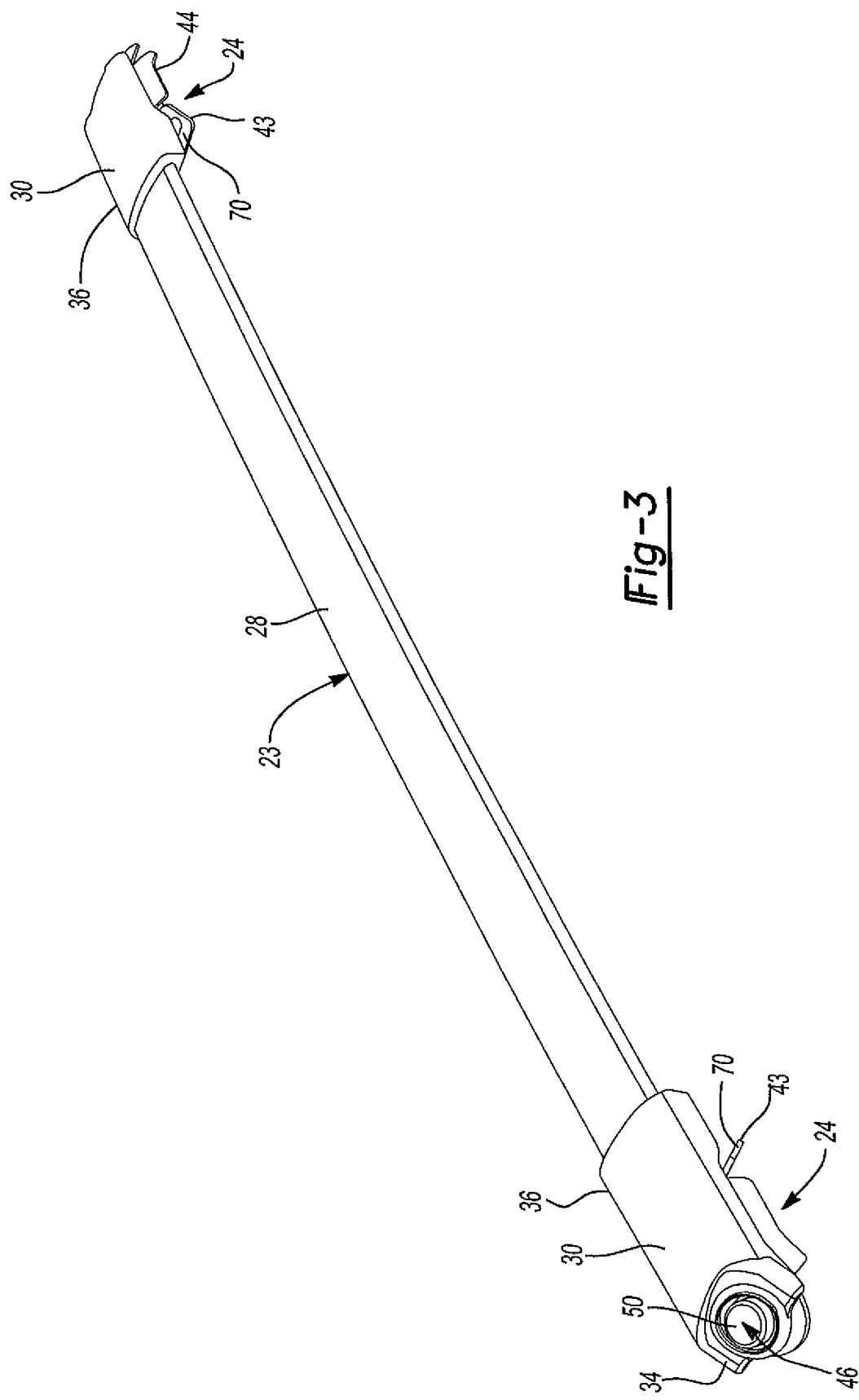
FIG. 3 is another perspective view of one of the roof bows of FIG. 1 with the end cap assemblies in a stowed position.
Figure 4:
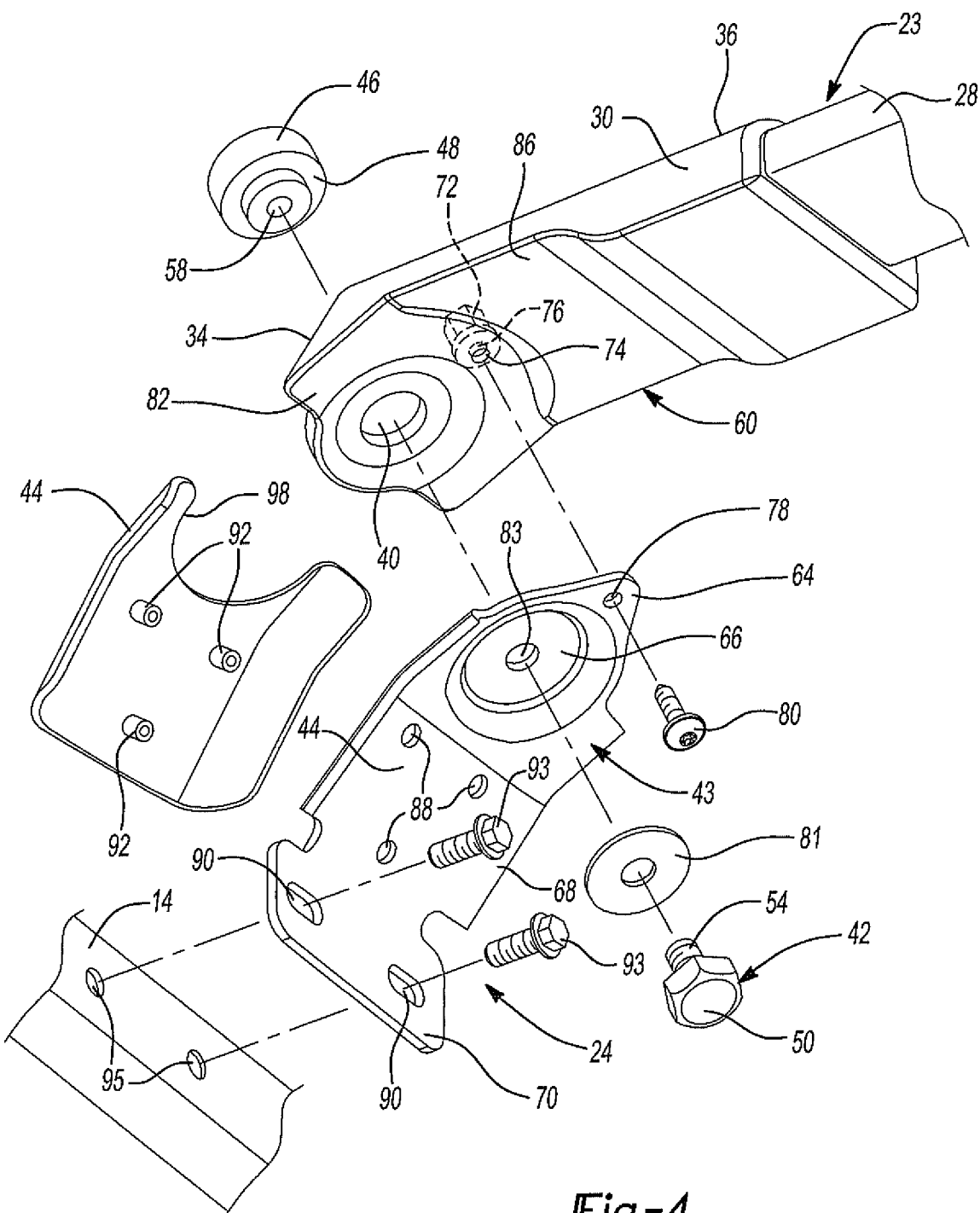
FIG. 4 is an exploded view of one of the end cap assemblies of the roof bow.

A length of the roof bow 22 is greater when the end brackets 43 are in the deployed position (FIG. 2) than when the end brackets 43 are in the stowed position (FIG. 3). In this way, when the roof bow 22 is disconnected from the side rails 14, the roof bow 22 can be conveniently stored in a storage bin or area (not shown) that is within the vehicle 10 (e.g., the roof bow 22 can be stored in a storage bin that is disposed within a trunk of the vehicle 10). When the end brackets 43 are in the stowed position, the end brackets 43 are positioned between opposing ends of the cross member 23 (FIG. 3).

Each end bracket 43 is made of a metallic material (e.g., steel) and includes a coupling portion 64, a pivot portion 66, a decorative portion 68 and an attachment portion 70. A hub 72 is disposed within an opening 74 that is formed in the end cap 30 such that the hub 72 is flush with the end cap 30. The hub 72 includes an aperture 76 that is threaded. The coupling portion 64 extends from the pivot portion 66 and includes an opening 78 that is aligned with the aperture 76 of the hub 72 when the end bracket 43 is in the deployed position and unaligned with the aperture 76 of the hub 72 when the end bracket 43 is in the stowed position. A fastener 80 extends through the opening 78 of the coupling portion 64 and at least partially through the aperture 76 of the hub 72, thereby securing the end bracket 43 in the deployed position. The fastener 80 and the hub 72 are hidden view from the outside of the vehicle 10.

As shown in FIGS. 8 and 9, the pivot portion 66 is positioned between the coupling portion 64 and the decorative portion 68 and is positioned within a pivot section 82 of the recess 60 of the end cap 30 when the end bracket 43 is in the stowed position and the deployed position. The pivot section 82 of the recess 60 opposes the recess 32. The pivot pin 42 extends through an aperture 83 of the pivot portion 66, the aperture 40 of the end cap 30 and at least partially through the cap 46, and pivotably couples the end bracket 43 to the end cap 30. A washer 81 is positioned between the head 50 of the pivot pin 42 and the pivot portion 66 such that a surface of the pivot portion 66 contacts a surface of the recess 60.

The decorative portion 68 is positioned between the attachment portion 70 and the pivot portion 66, and is positioned within a decorative section 86 of the recess 60 of the end cap 30 when the end bracket 43 is in the stowed position (FIG. 9) and removed from the decorative section 86 of the recess 60 when the end bracket 43 is in the deployed position (FIG. 8). The decorative section 86 of the recess 60 is positioned inwardly relative to the pivot section 82 of the recess 60 (i.e., the pivot section 82 of the recess 60 is positioned closer toward the end 34 of the end cap 30). The decorative portion 68 extends outwardly from the end cap 30 when the end bracket 43 is in the deployed position. The decorative portion 68 includes a plurality of apertures 88 extending therethrough. The coupling portion 64, the pivot portion 66, the decorative portion 68 are angled relative to the elongated body 28 and the attachment portion 70 (i.e., non-perpendicular angle) when the end bracket 43 is in the deployed position.

The attachment portion 70 extends vertically from an end of the decorative portion 68 when the end bracket 43 is in the deployed position and extends at an angle (i.e., non-perpendicular) relative to the elongate body 28 when the end bracket 43 is in the stowed position. The attachment portion 70 is configured to be attached to a respective side rail 14. The attachment portion 70 includes a plurality of apertures 90 that are formed therein. Fasteners 93 extend through the apertures 90 and at least partially through apertures 95 in the respective side rail 14, thereby attaching the end bracket 43 and the respective side rail 14 to each other when the end bracket 43 is in the deployed position.

The decorative member 44 can be made of a polymeric or metallic material, for example, and is attached to the decorative portion 68 of the end bracket 43. That is, the decorative member 44 includes a plurality of projections 92 that extend from a bottom surface 94 thereof and are securely received in the apertures 88 of the decorative portion 68, thereby attaching the decorative portion 68 and the end bracket 43 to each other. An end of the decorative member 44 includes a groove 98 formed therein that accommodates the pivot portion 66 of the end bracket 43.

One of the benefits of the roof bow 22 of the present disclosure is that the roof bow 22 can be conveniently stored in a storage bin or area that is within the vehicle 10 (e.g., the roof bow 22 can be stored in a storage bin that is disposed within a trunk of the vehicle 10) when removed from the vehicle 10 and in the stowed position. This allows for the functionality of the roof bows 22 when they are needed and allows for improved aesthetics of the vehicle 10 when the roof bows 22 are not needed.

What is claimed is:

1. A vehicle comprising:
    a vehicle body having a roof; and
    a roof bow removably coupled to the roof of the vehicle body and including a cross member and end brackets pivotably attached to opposing ends of the cross member, the end brackets pivotable between a deployed position in which the end brackets extend outwardly from the cross member and a stowed position in which the end brackets are positioned substantially between opposing ends of the cross member,
    wherein a length of the roof bow is greater when the end brackets are in the deployed position then when the end brackets are in the stowed position; wherein each end bracket is pivotable about a respective pivot axis that extends at a non-perpendicular angle to a vertical axis.

2. The vehicle of claim 1, wherein the cross member includes an elongated body and end caps fixed to opposing ends of the elongated body, and wherein the end brackets are pivotally coupled to the end caps.

3. The vehicle of claim 2, wherein the elongated body and the end brackets are made of a metallic material and the end caps are made of a polymeric material.

4. The vehicle of claim 2, wherein each end cap includes a recess formed therein, and wherein each end bracket is received in the recess when in the stowed position.

5. The vehicle of claim 4, wherein the recess has a pivot section and a decorative section, and wherein the end bracket has a pivot portion and decorative portion.

6. The vehicle of claim 5, wherein the pivot portion is received in the pivot section when the end bracket is in the stowed position and when the end bracket is in the deployed position, wherein the decorative portion is received in the decorative section when the end bracket is in the stowed position, and wherein the decorative portion is removed from the decorative section when the end bracket is in the deployed position.

7. The vehicle of claim 5, wherein the decorative section of the recess is positioned inwardly relative to the pivot section of the recess.

8. The vehicle of claim 2, wherein a fastener extends through a respective one of the end brackets and a respective one of the end caps when the respective one of the end brackets is in the deployed position to retain the respective one of the end brackets in the deployed position.

9. The vehicle of claim 1, wherein the angle between the respective pivot axis and the vertical axis is between 20 degrees and 75 degrees.

10. The vehicle of claim 1, further comprising side rails coupled to opposing sides of the roof and extending parallel to each other, and wherein the roof bow extends between the side rails and each end bracket is removably coupled to a respective side rail.

11. The vehicle of claim 1, further comprising another roof bow removably coupled to the roof the vehicle body.

12. The vehicle of claim 1, wherein each end bracket is rotated between 150 degrees and 195 degrees about a respective pivot axis from the deployed position to the stowed position.

13. The vehicle of claim 1, wherein a decorative member is coupled to each end bracket.

* * * * *